(12) United States Patent
Miao et al.

(10) Patent No.: US 8,080,411 B2
(45) Date of Patent: Dec. 20, 2011

(54) SHALLOW MULTI-WELL PLASTIC CHIP FOR THERMAL MULTIPLEXING

(75) Inventors: Yubo Miao, Singapore (SG); Yu Chen, Singapore (SG); Tit Meng Lim, Singapore (SG); Chew Kiat Heng, Singapore (SG)

(73) Assignees: Agency for Science, Technology and Research, Singapore (SG); National University of Singapore, Singapore (SG)

( * ) Notice: Subject to any disclaimer, the term of this patent is extended or adjusted under 35 U.S.C. 154(b) by 449 days.

(21) Appl. No.: 12/288,373

(22) Filed: Oct. 20, 2008

(65) Prior Publication Data
US 2009/0053801 A1 Feb. 26, 2009

Related U.S. Application Data

(62) Division of application No. 10/613,599, filed on Jul. 3, 2003, now Pat. No. 7,442,542.

(60) Provisional application No. 60/456,929, filed on Mar. 24, 2003.

(51) Int. Cl.
*C12M 1/02* (2006.01)
*C12M 1/40* (2006.01)
*G01N 1/44* (2006.01)

(52) U.S. Cl. ............... 435/288.4; 435/303.1; 435/305.2; 435/809; 422/552; 422/943

(58) Field of Classification Search ............... 435/288.4, 435/303.1, 305.2, 809; 422/102, 552, 553, 422/943
See application file for complete search history.

(56) References Cited

U.S. PATENT DOCUMENTS

| | | | | |
|---|---|---|---|---|
| 4,349,510 A | * | 9/1982 | Kolehmainen et al. | ......... 422/66 |
| 4,613,393 A | | 9/1986 | Cattanach et al. | |
| 4,883,642 A | * | 11/1989 | Bisconte | ......... 422/66 |
| 5,447,679 A | | 9/1995 | Eigen et al. | |
| 5,646,039 A | | 7/1997 | Northrup et al. | |
| 5,939,312 A | | 8/1999 | Baier et al. | |
| 7,442,542 B2 | * | 10/2008 | Miao et al. | ......... 435/288.4 |
| 2002/0034616 A1 | * | 3/2002 | Vanmaele et al. | ......... 428/195 |
| 2002/0072096 A1 | | 6/2002 | O'Keefe et al. | |

FOREIGN PATENT DOCUMENTS

| | | |
|---|---|---|
| EP | 1 000 661 A1 | 5/2000 |
| JP | 4008513 | 1/1992 |
| JP | 9234751 | 9/1997 |
| WO | WO 93/09872 | 5/1993 |
| WO | WO 02/40158 A2 | 5/2002 |
| WO | WO 03/059518 A1 | 7/2003 |

* cited by examiner

*Primary Examiner* — William H Beisner
(74) *Attorney, Agent, or Firm* — Saile Ackerman LLC; Stephen B. Ackerman

(57) ABSTRACT

Disposable units in current use for performing PCR are limited by their heat block ramping rates and by the thermal diffusion delay time through the plastic wall as well as by the sample itself. This limitation has been overcome by forming a disposable plastic chip using a simple deformation process wherein one or more plastic sheets are caused, through hydrostatic pressure, to conform to the surface of a suitable mold. After a given disposable chip has been filled with liquid samples, it is brought into close contact with an array of heating blocks that seals each sample within its own chamber, allowing each sample to then be heat treated as desired.

14 Claims, 4 Drawing Sheets

SHALLOW MULTI-WELL PLASTIC CHIP FOR THERMAL MULTIPLEXING

This is a divisional application of U.S. patent application Ser. No. 10/613,599, filed on Jul. 3, 2003 now U.S. Pat. No. 7,442,542, which claims priority to U.S. Provisional Application No. 60/456,929 filed on Mar. 24, 2003 which are herein incorporated by reference in their entirety, and assigned to a common assignee.

FIELD OF THE INVENTION

The invention relates to the general field of simultaneously heating multiple micro-specimens with particular reference to polymerase chain reactions.

BACKGROUND OF THE INVENTION

The polymerase chain reaction (PCR) is a widely used technique in biology. Conventional PCR instruments consist of plastic plates and hot plates. The plastic plates house multiple tubes that serve as reaction chambers and are placed on the hot plates for thermal cycling. PCR amplification is very slow due to the large sample volumes as well as the thick walls of the plastic tubes. Only a single protocol can be performed each time. Development of a new generation PCR has focused on rapid, multi-chamber, independent control PCR.

An important advantage of miniaturized PCR is fast speed. It has been shown that quick and accurate thermal cycling can be readily achieved, with very small sample volume consumption, by using micro-PCR techniques (1). Most of the recently developed micro-PCR equipment has been fabricated using microelectronic techniques which are in widespread use for the manufacture of integrated circuits (ICs) for semiconductor and micro-electromechanical (MEMS) systems. Reaction chamber, heat sources, and temperature sensors are integrated on a silicon substrate which has excellent thermal properties.

However, due to the high grade materials and sophisticated processing that are involved, micro-PCR equipment of this type tends to be expensive, making it unsuitable for use in environments, such as biomedical applications, in which a disposable chip is usually required.

Baier [2] has shown that a low cost multi-chamber thermal cycler, using the same thermal protocols possible in silicon, can be developed. Plastics have been investigated for use in disposable micro-PCR, but plastics have only fair thermal conductivity compared to silicon which might result in a slow thermal response and poor temperature uniformity.

An ultra thin-walled multi-well plate for thermal cycling has been described by Tretiakov and Saluz (3). The thin wall (30-50_m) reduced the thermal delay through the wall efficiently but use of a tube-like (V) shape for the chamber itself increased the thermal delay, thick samples being the dominant source of this delay. Another drawback of the tube approach is evaporative loss from the sample due to the presence of air in the tube. An example of this type of structure is schematically illustrated in FIGS. 1a and 1b where FIG. 1b is a cross-section of part of FIG. 1a. FIG. 1a shows an array of tube holders 12 distributed over the surface of heating block 11. As seen in FIG. 1b, each tube holder allows a disposable sample tube 13 to be kept in position close to heater 11.

In designs such as that shown in FIG. 1b, PCR speed is limited by the heat block ramping rate and the thermal diffusion delay time through the plastic wall as well as the sample itself. A similar approach has been described by Icke et al. (4). The air gap is miniaturized with an appropriate large thermal contact using a U shaped chamber. O'Keefe et al. disclose a multi-chamber plate where each chamber is fully filled by a sample without any air (5). However, said chamber is open on two sides, making full sealing for the reaction questionable. It is suitable for sample handling rather than for use as a reaction chamber. The preferred application of both the above designs is for a single protocol.

The present invention discloses a low cost disposable plastic chip that is well suited for use as a multiplexing thermal cycler.

References

1. M. Allen Northrup, et al, "Microfabricated reactor", U.S. Pat. No. 5,646,039, Jul. 8, 1997.
2. Baier Volker, et al, (Jena Germany), "Miniaturized multi-chamber thermocycler", U.S. Pat. No. 5,939,312, Aug. 17, 1999.
3. Alexandre Tretiakov, et al, "Ultrathin-walled multiwell plate for heat block thermo-cycling", EP 1 000 661 A1, May 17, 2000.
4. Richard ICKE, et al, "Reactor plate", WO 02/40158 A2, May 23, 2002
5. Mattew O'Keefe, et al, "Apparatus and methods for parallel processing of micro- volume liquid reactions", US 2002/0072096 A1, Jun. 12, 2002.

SUMMARY OF THE INVENTION

It has been an object of at least one embodiment of the present invention to provide a disposable plastic chip for use in performing multiple simultaneous polymerase chain reactions.

Another object of at least one embodiment of the present invention has been to provide a process for effectively using said disposable plastic chip.

These objects have been achieved by forming said disposable plastic chip through a simple deformation process wherein one or more plastic sheets are caused, through hydrostatic pressure, to conform to the surface of a suitable mold. After a given disposable chip has been filled with liquid samples, it is brought into close contact with an array of heating blocks that seals each sample within its own chamber, allowing each sample to then be heat treated as desired.

DESCRIPTION OF THE PREFERRED EMBODIMENTS

The present invention discloses a multi-well plastic chip, which is optimized for thermal performance and with a fluidic manifold for thermal cycling. More specifically, it concerns a thin and shallow multi-well chip with depth of not more than 0.5 mm. A given sample will fully fill its chamber, forming, in effect, a thin film sample layer. Relative to a silicon multi-chamber thermal cycler, the ramping speed of the present invention is faster (due to the geometry and small size of each chamber). The thin wall of the plastic chip in this invention reduces thermal diffusion delay time effectively. The thin wall of 200 μm can give less than 0.5 seconds of delay time compared with conventional PCR plate of few seconds. The shallow well of 400 μm sample "film" gives 1 second of delay time. The total delay time in a shallow/thin well is up to 50 times less than in the tube. Another drawback of tube is the air gap inside the well, which influences sample reaction due to sample evaporation. It also limits the minimum volume that can be used in a tube. In this invention the air gap is eliminated The plastic chip of this invention can be used for independently controlled thermal cycling. Thermal cross talk between chambers is minimized by the thin cross-section of the connections between wells. This gives better temperature uniformity (<0.5%C) and more precise temperature control (0.1%C) for each well.

For this technology, the Influence of bubbles can be significant. It results in poor temperature uniformity and builds high pressure inside the chambers. The present invention employs micro-channels to eliminate the generation of bubbles during sample injection. Samples load/unloaded through the micro-channels will be bubble free. How wells are sealed is also very important because the sealing means are directly exposed to the solution. Normal tape, for example, is not the solution-resistant.

Thermal bonding or welding techniques are better suited to chip sealing. Hot lid sealing is another popular technique for tube plastic plates. It needs to be kept within a certain temperature range to protect against evaporation. However, any modification of the present invention that involves attaching additional parts to the plastic chip will change the thermal profile significantly. Double-sided thermal cycling of the plastic chip can be used in the current case. The sealing force can be applied through the top thermal cycler.

Plastic thermal forming technology is used to prepare the plastic chip in this invention. Conventional plastic forming technology includes mold injection, hot embossing and vacuum thermal forming. The forming technology used here differs from, and improves over, vacuum thermal forming. Through this method, a molding force greater than 1 atmosphere (which is the maximum achievable with vacuum forming) can be applied to the thin plastic.

Figure 1A:
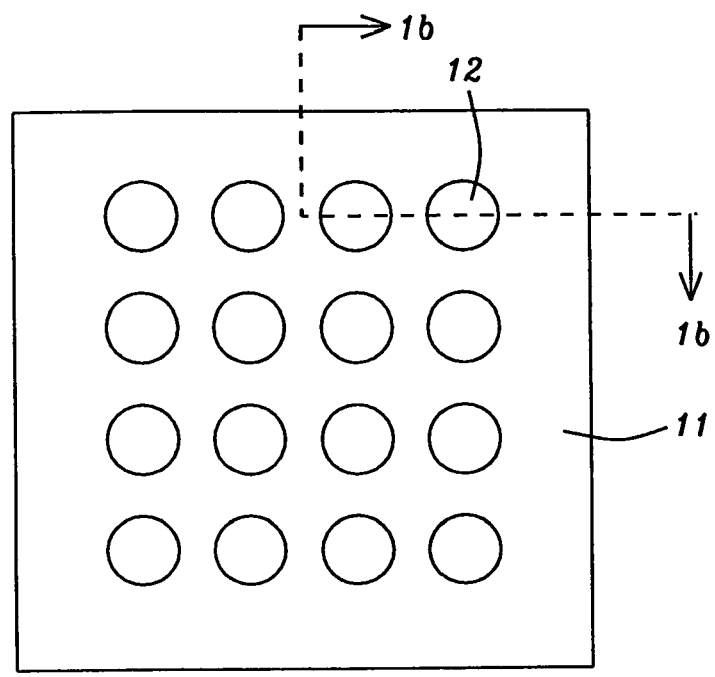
FIGS. 1a and 1b illustrate the prior art.
Figure 1B:
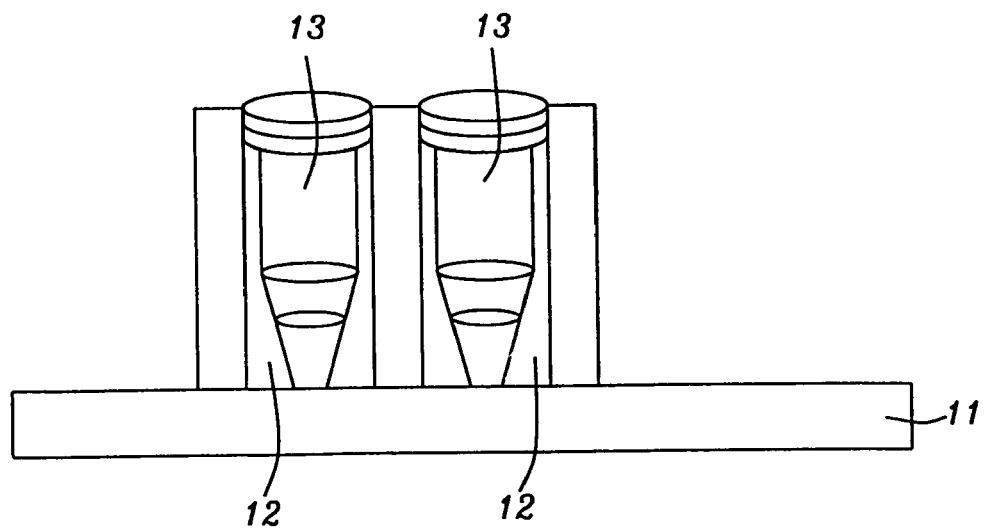
Figure 2:
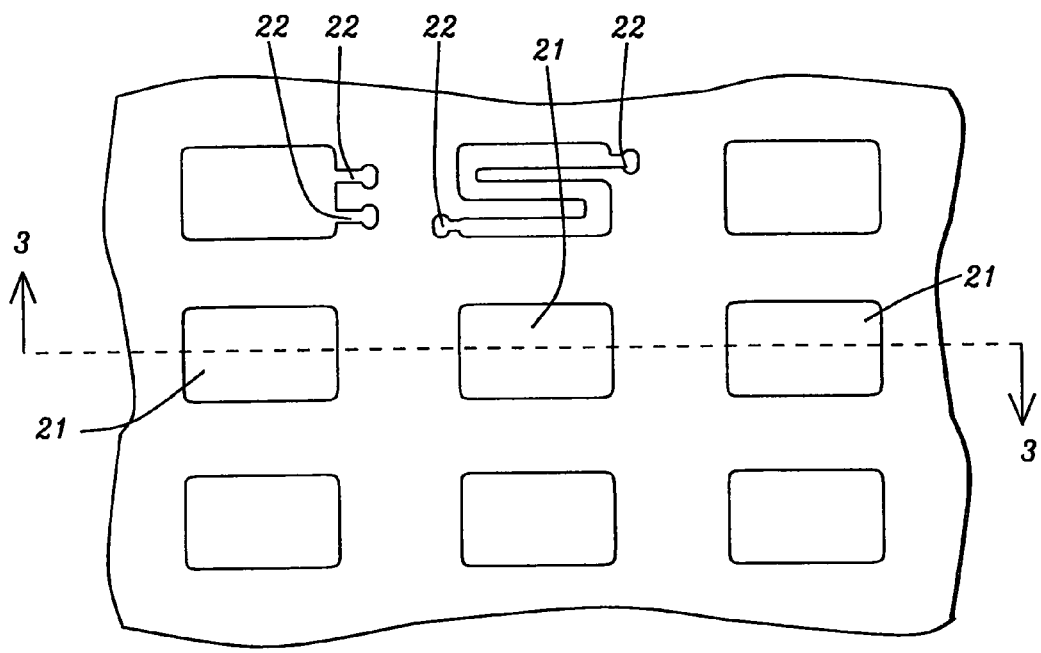
FIG. 2 is a plan view of the disposable plastic chip disclosed in the present invention.
Figure 3:
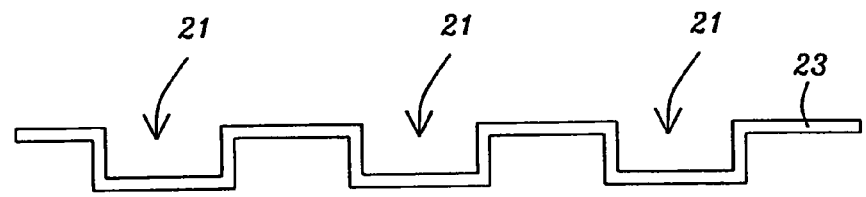
FIG. 3 is a cross-section taken through FIG. 2.

Referring now to FIG. 2, we show there a plan view of a portion of a single chip while FIG. 3 represents a cross-section taken along line 3-3. As can be seen, the chip comprises an array of depressions 21, each such depression being intended for use as a sample chamber. Also shown in FIG. 2 are micro-channels 22 that are used for loading and unloading liquid sample into and out of the chambers 21. Many designs for such micro-channels are possible, the two that appear in FIG. 2 being simply examples. By using micro-channels to load and unload liquid, bubble formation is eliminated.

The cross-sectional view of the disposable chip that is seen in FIG. 3 illustrates several important features of the present invention:

(1) The low thickness of plastic sheet 23 (less than about 200 microns) ensures good thermal isolation between wells 21; relative to all neighboring heat sources, each chamber has a thermal conductance that is less than about 50-70 WK$^{-1}$.

(2) The shallow depth (less than about 500 microns) of wells 21 implies that they hold only a small volume of sample liquid, while presenting a large surface area, so heat transfer into and out of the liquid in the well can be very rapid, each chamber having a thermal conductance that is about 2-4×10$^3$ WK$^{-1}$.

(3) There is sufficient surface material between the wells to allow the wells to be properly sealed in a single operation (see below).

(4) Since very little plastic is needed and the process to form the chips is not expensive (see below) it is economical to dispose of the entire chip after a single use.

Figure 4:
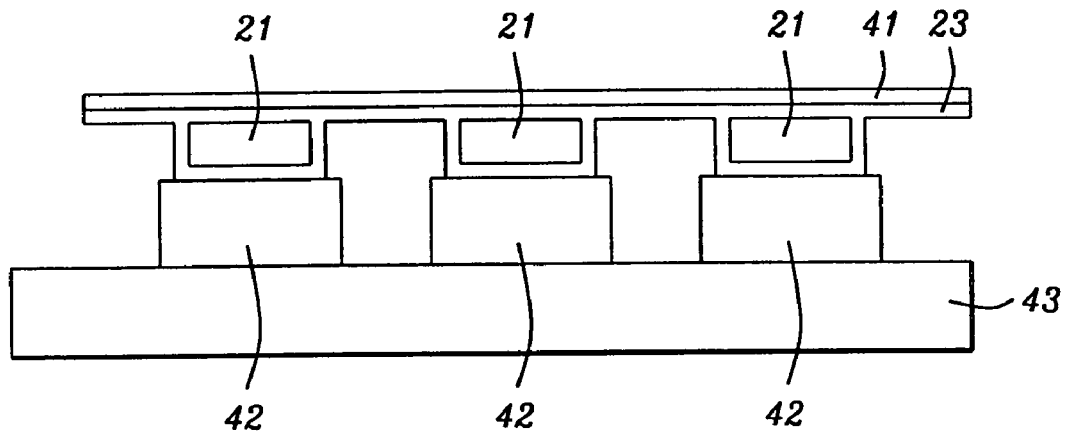
FIG. 4 illustrates a first embodiment wherein each chamber rests on a heating block but are not heated from above.

Referring now to FIG. 4, we show a first embodiment of a process for multi-chamber thermal multiplexing using the above-described disposable chip. Chip 23 is placed on an array of heating blocks 42, that share a common substrate 43, and bonded thereto to ensure good heat transfer. Our preferred bonding method for this has been flipchip bonding technology. The size and spacing of heating blocks 42 matches that of chambers 21.

After chambers (or wells) 21 have been filled with liquid samples, cover slip 41 is bonded to the top surface of 23 to ensure that each liquid sample is completely sealed within its own chamber. For this sub-process, our preferred cover slip material has been any that is biocompatible while our preferred bonding method has been flipchip bonding.

Then, with the samples safely sealed, the heating blocks 42 are used to heat the liquid samples. Time and/or temperature may be customized for each sample as needed and the composition of the samples may vary from one well to the next, should this be needed. When all samples have been heat treated, cover slip 41 is detached from chip 23 by heating.

Chip 23 is then separated from heating blocks 42 since thermal grease was used for making contact.

Figure 5:
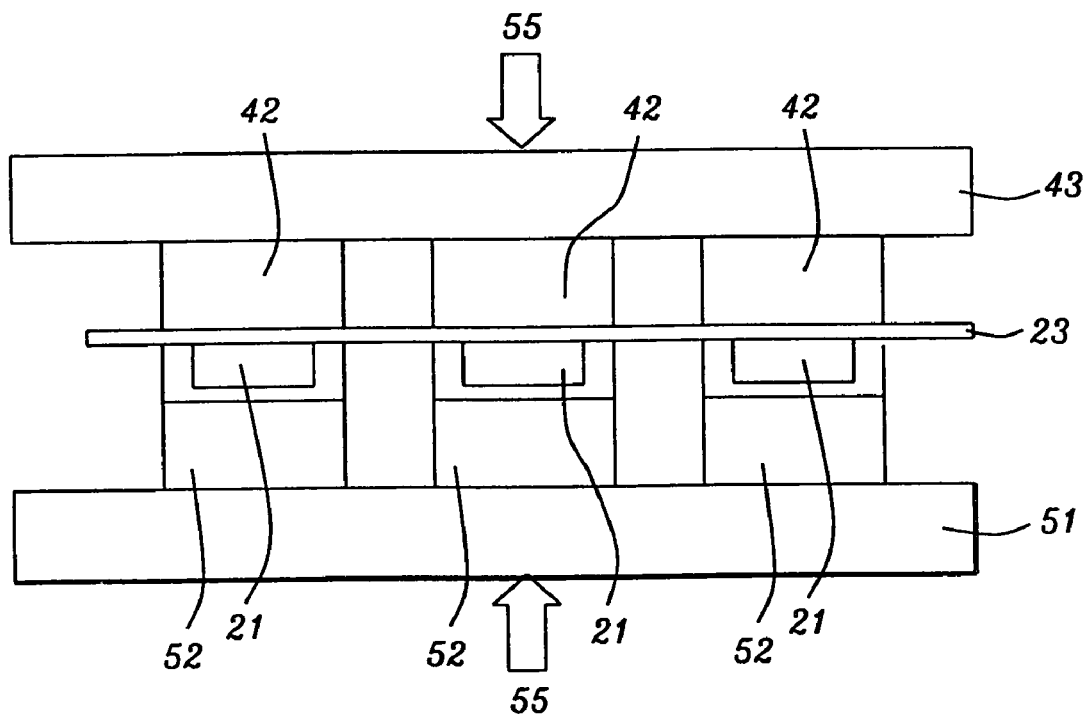
FIG. 5 illustrates a second embodiment wherein each chamber rests on a heat sink/source and is heated from above by a heating block

Referring now to FIG. 5, we show a second embodiment of a process for multi-chamber thermal multiplexing using the disposable chip. An array of heat sinks 52, whose size and spacing matches that of the multi-chamber array and that share a common substrate 51, is provided. Each heat sink 52 includes in its top surface a cavity into which one of said wells just fits so that each well can be inserted into a corresponding cavity, thereby ensuring good heat transfer between elements 21 and 52.

After filling chambers 21 with their liquid samples, heating block array 42 (whose size and spacing matches that of the multi-chamber array) is placed in contact with the latter so that each liquid sample is completely isolated within its own chamber. Then, uniform pressure 55 is applied and maintained between the heat sink and heating block arrays, thereby ensuring good heat transfer between them and the liquid samples in wells 2, following which heating blocks 42 are used to heat said liquid samples.

Note that heat sinks 52 may also be made to serve as heat sources, either exclusively or temporarily, to further reduce the time needed to raise the liquid samples to their required temperatures.

As in the first embodiment, time and/or temperature may be customized for each sample as needed and the composition of the samples may vary from one well to the next, should this be needed. When all samples have been heat treated, pressure 55 is terminated so blocks 42 and 52 are readily separated from chip 23 thereby allowing the liquid samples to be accessed and individually removed for further processing, following which chip 23 may be discarded.

Figure 6:
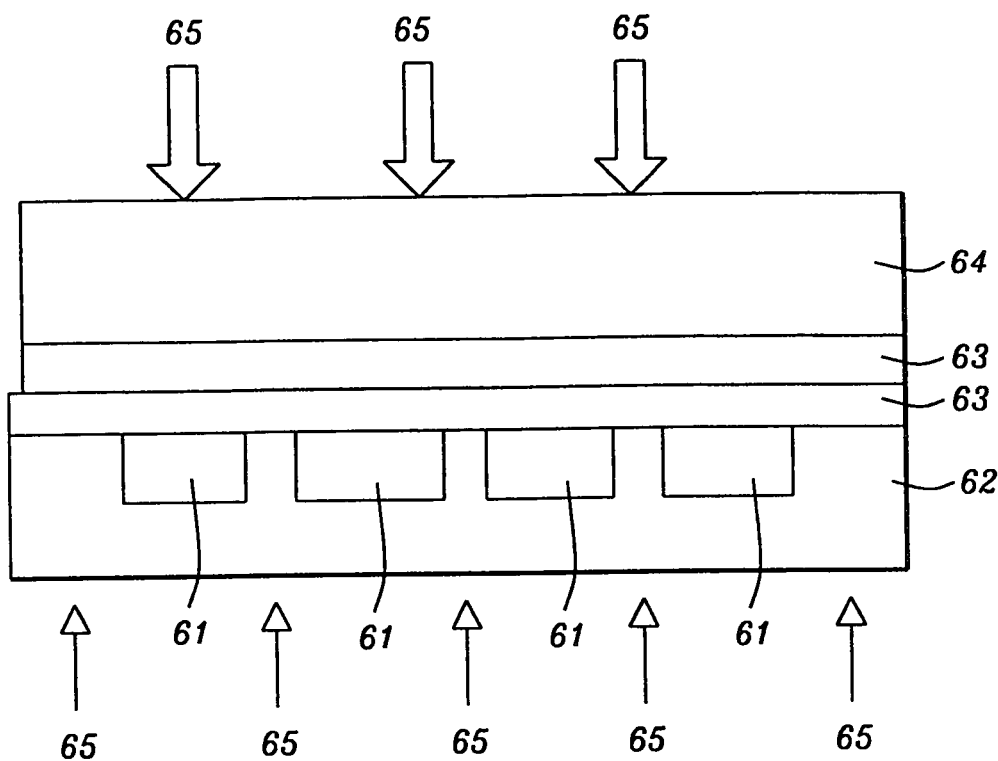
FIGS. 6 and 7 illustrate the process used to manufacture the disposable plastic chip.

To illustrate the process used to manufacture the disposable plastic chip itself, we refer now to FIG. 6. This process begins with the provision of mold 62, whose surface includes an array of depressions 61 that will determine the depth and area of each well. Our preferred material for the mold has been silicon but similar materials such as nickel or other molding materials could have been used.

At least one sheet of plastic material 63 is placed on the mold surface. Examples of suitable materials include, but are not limited to, PC/PP/PET (PolyCarbonate/PolyPropylene/PolyEsTer). If thin enough sheets can be obtained and worked, several such sheets may be used (we show two sheets in FIG. 6). Multiple thin sheets are easier to deform than a single thick sheet since the sheets can slide past one another during the deformation process.

A thicker sheet of a different plastic material 64 is now placed over the first sheet(s) 63. Possible materials for this include, but are not limited to, PC/PMMA (PolyCarbonate/PolyMethylMethAcrylate) A key quality of the second sheet material 64 is that it should have a softening temperature that is about 50-100° C. lower than that of sheet(s) 63.

Figure 7:
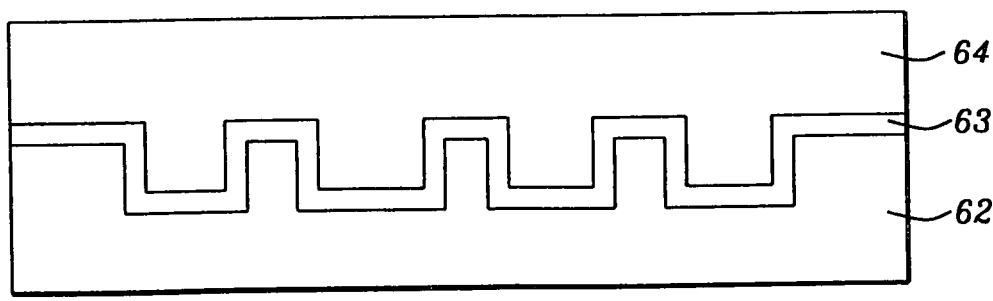

The entire assemblage is now heated to a temperature between the softening temperatures of materials 63 and 64 and uniform pressure 65 is applied between plastic sheet 64 and mold 62 thereby causing plastic material 64 to flow. This, in turn, exerts uniform hydrostatic pressure on sheet(s) 63 forcing it to conform to the surface of mold 62 as illustrated in FIG. 7. Then, after cooling to a temperature below which plastic 64 has fully hardened, the two plastic layers 63 and 64 are separated from one another and 63 is removed to be used as described earlier as a disposable multi-chamber chip.

It is important to note that the more standard approach of using a high temperature hydraulic fluid to transmit the applied pressure to sheets 63 was not used because a soft glassy material, as opposed to an oil, was needed.

What is claimed is:

1. A disposable multi-chamber chip wherein each chamber has low thermal capacity and is thermally isolated from its neighbors, comprising;
    a continuous plastic sheet having a top surface and a thickness that is less than about 200 microns;
    an array of depressions in said plastic sheet that extend downwards from said top surface a distance of no more than about 500 microns;
    said depressions being separated one from another by at least 1 mm; and
    micro-channels that extend outwards, parallel to said top surface, from said depressions, serving thereby to prevent bubble formation.

2. The disposable multi-chamber chip described in claim 1 further comprising an attached outer frame that serves to increase the rigidity of said chip.

3. The disposable multi-chamber chip described in claim 1 wherein said plastic sheet is selected from the group consisting of PP, PC, and PET.

4. The disposable multi-chamber chip described in claim 1 wherein, relative to all neighboring heat sources, each chamber has a thermal conductance that is less than 50-70 $WK^{-1}$.

5. The disposable multi-chamber chip described in claim 1 wherein a temperature uniformity of less than about 0.5° C. can be maintained within a given liquid placed in one of said depressions.

6. The disposable multi-chamber chip described in claim 1 wherein a given liquid, placed in one of said depressions, can have its mean temperature controlled to a precision level of about 0.1° C.

7. A multi-chamber thermal multiplexer, comprising;
    a disposable plastic chip in the form of a continuous plastic sheet having a top surface and a thickness that is less than about 200 microns;
    an array of depressions in said plastic sheet that extend downwards from said top surface a distance of no more than about 500 microns;
    said depressions being separated one from another by at least 1 mm;
    said plastic chip being in contact with an array of heating blocks whose size and spacing matches that of said multi-chamber array;
    at least two of said chambers being filled with liquid samples;
    a cover slip being bonded to said top surface so that each liquid sample is completely sealed within its own chamber; and
    micro-channels that extend outwards, parallel to said top surface, from said depressions, serving thereby to prevent bubble formation.

8. The multi-chamber thermal multiplexer described in claim 7 further comprising an outer frame attached to said disposable chip that serves to increase the rigidity of said chip.

9. The multi-chamber thermal multiplexer described in claim 7 wherein said disposable plastic chip is selected from the group consisting of PP, PC, and PET.

10. The multi-chamber thermal multiplexer described in claim 7 wherein each chamber has a thermal capacity that is less than 50-70 $WK^{-1}$.

11. A multi-chamber thermal multiplexer, comprising;
    a disposable plastic chip in the form of a continuous plastic sheet having a top surface and a thickness that is less than about 200 microns;
    an array of depressions in said plastic sheet that extend downwards from said top surface a distance of no more than about 500 microns;
    said depressions being separated one from another by at least 1 mm;
    the disposable plastic chip having been inserted into cavities, each such cavity being located within an array of heat sinks whose size and spacing matches that of said multi-chamber array;
    at least two of said chambers having been filled with liquid samples;
    said plastic chip top surface being bonded to an array of heating blocks whose size and spacing matches that of said multi-chamber array so that each liquid sample has been completely sealed within its own chamber; and
    micro-channels that extend outwards, parallel to said top surface, from said depressions, serving thereby to prevent bubble formation.

12. The multi-chamber thermal multiplexer described in claim 11 further comprising an outer frame attached to said disposable chip that serves to increase the rigidity of said chip.

13. The multi-chamber thermal multiplexer described in claim 11 wherein said disposable plastic chip is selected from the group consisting of PP, PC, and PET.

14. The multi-chamber thermal multiplexer described in claim 11 wherein, relative to all neighboring heat sources, each chamber has a thermal conductance that is less than 50-70 $WK^{-1}$.

* * * * *